(12) United States Patent
Bond

(10) Patent No.: US 11,033,024 B2
(45) Date of Patent: Jun. 15, 2021

(54) SEALING AND ANTIMICROBIAL/ANTI-MOLD MICROEMULSION AND METHOD OF USE

(71) Applicant: Jerry R. Bond, Flowery Branch, GA (US)

(72) Inventor: Jerry R. Bond, Flowery Branch, GA (US)

( * ) Notice: Subject to any disclaimer, the term of this patent is extended or adjusted under 35 U.S.C. 154(b) by 98 days.

(21) Appl. No.: 16/406,169

(22) Filed: May 8, 2019

(65) Prior Publication Data

US 2019/0343115 A1    Nov. 14, 2019

Related U.S. Application Data

(60) Provisional application No. 62/668,415, filed on May 8, 2018.

(51) Int. Cl.

| *A01N 25/04* | (2006.01) |
|---|---|
| *A01N 59/16* | (2006.01) |
| *A01N 65/44* | (2009.01) |
| *A01N 65/22* | (2009.01) |
| *A01N 41/02* | (2006.01) |

(52) U.S. Cl.
CPC ............. *A01N 25/04* (2013.01); *A01N 41/02* (2013.01); *A01N 59/16* (2013.01); *A01N 65/22* (2013.01); *A01N 65/44* (2013.01)

(58) Field of Classification Search
CPC ................................ A01N 25/04; A01N 25/02
See application file for complete search history.

(56) References Cited

U.S. PATENT DOCUMENTS

| 2009/0214606 | A1* | 8/2009 | Bujard ................... | A23G 4/064 |
|---|---|---|---|---|
| | | | | 424/401 |
| 2014/0178496 | A1* | 6/2014 | Macoviak ................ | A61K 8/19 |
| | | | | 424/618 |
| 2016/0330969 | A1* | 11/2016 | O'Connell, Jr. ........ | A61K 33/20 |

OTHER PUBLICATIONS

Inert Ingredients Eligible for FIFRA 25(b) Pesticide Products, EPA (Year: 2016).*
Active Ingredients Eligible for Minimum Risk Pesticide Products, EPA (Year: 2015).*

* cited by examiner

*Primary Examiner* — Nathan T Leong
(74) *Attorney, Agent, or Firm* — Clark & Brody LP

(57) ABSTRACT

A botanical food grade anti-microbial, anti-mold, cleaning and sealing formulation includes a microemulsion that contains effective amounts of active ingredients of zinc, a surfactant, thyme oil, tea tree oil, and lemon grass oil, and effective amounts of inactive ingredients of a pH adjuster, glycerin, and alcohol, the active and inactive ingredients combined with water to produce a clear microemulsion for application.

11 Claims, No Drawings

SEALING AND ANTIMICROBIAL/ANTI-MOLD MICROEMULSION AND METHOD OF USE

This application claims priority based on provisional application no. 62/668,415, filed on May 8, 2018, and the entirety of this application is incorporated by reference herein.

FIELD OF THE INVENTION

The invention relates to a sealing and antimicrobial/anti-mold microemulsion and a method of use, and particularly a microemulsion containing zinc and other components that can be applied to a surface to prevent/inhibit mold and bacterial growth and protect the surface.

BACKGROUND ART

In the prior art, the use of various products, including cleaners, sealants, disinfectants, repellants and the like to control or prevent the growth of bacteria and mold, repel insects, provide UV protection, etc. are well known. Many of these types of products use ingredients that could be harmful to the environment, humans, animals, etc. Also, these products may not have stability or provide long lasting effects. Therefore, there is a need to provide these types of products in improved form to avoid the drawbacks of prior art products.

SUMMARY OF THE INVENTION

One object of the invention is to provide a zinc-dust containing microemulsion that is safe to use and has a number of different uses, for example, sealing surfaces, UV protection, insect repellency, anti-microbial and anti-mold protection, and the like.

In one embodiment, the microemulsion comprising, in weight percent:
zinc dust in an amount ranging from about 0.27 to 0.37%,
at least one surfactant in an amount ranging from about 2.48 to 3.36%,
citric acid in an amount ranging from about 1.62 to 2.20%,
glycerin in an amount ranging from about 40.0 to 54.1%,
alcohol with a proof ranging from 90 to 180 and in an amount ranging from about 2.81 to 3.81%,
tea tree oil in an amount ranging from about 0.17 to 0.23%,
thyme oil in an amount ranging from about 0.18 to 0.24%,
lemongrass oil in an amount ranging from about 0.037 to 0.048%,
a pH adjuster to adjust the pH of the microemulsion between 2.3 and 3.3, and
water, the weight percentages based on the weight of a gallon of water, or 8.3 lbs.

The pH of the emulsion can be adjusted using an acid like sulfuric or acetic acid and the alcohol is preferably isopropanol.

The surfactant used in the microemulsion can be one or more of sodium lauryl sulfate, coco glucoside or an EPA-approved surfactant, which is one accepted by the EPA and listed in EPA publications in connection with the minimum risk pesticides regulated by the EPA. This aspect of the invention is described below in more detail.

It is preferred that all components of the microemulsion are of food grade quality and/or that all components are listed on the EPA active and inactive/inert ingredients eligible for minimum risk pesticide products. This listing of inactive/inert ingredients approved for use by the EPA is also described in more detail below.

Another aspect of the invention involves a use of the microemulsion. In one application, the inventive method involves coating a surface for at least one of mold control, insect repellency, UV protection, or as antimicrobial by applying the microemulsion to the surface. While the surface can be any type of surface, preferred surfaces include one or more of metal, wood, masonry, plants, plastic, trees, and soil. Other surfaces suitable for coating include stucco, siding, shingles, decks, fences, grout, FRP board, ceilings, pipes, HVAC ducts, condensate lines, cooling coils, lawn furniture, stone and stonework, and wall chases. A preferred application is for at least mold control as coating, e.g., spraying a surface with the microemulsion can prevent mold growth for a significant period of time.

The microemulsion can be applied to a surface in any way. One or more ways include the use of a brush, a roller, a sprayer, a broom, or having the microemulsion wiped on the surface using an applicator like a cloth, rag, or the like, or is poured onto the surface.

DETAILED DESCRIPTION OF THE INVENTION

The sealing composition is a botanical food grade, antimicrobial, anti-mold, cleaner and sealant for all types of surfaces.

The sealing composition is formulated as a clear microemulsion, wherein an effective amount of zinc for at least anti-fungal and UV protection, is suspended in the formulation and a surfactant is also used to assist in the suspension of the zinc into the clear microemulsion.

The microemulsion is a clear, thermodynamically stable, isotropic liquid mixtures of oil, water and one or more surfactants. The aqueous phase may contain salt(s) and/or other ingredients, and the oil may actually be a complex mixture of different hydrocarbons and olefins. Microemulsions are contrasted with emulsions in that microemulsions form upon simple mixing of the components and do not require high shear conditions generally used in the formation of ordinary emulsions. The three basic types of microemulsions are direct (oil dispersed in water, o/w), reversed (water dispersed in oil, w/o) and bicontinuous.

In ternary systems such as microemulsions, where two immiscible phases (water and oil) are present with a surfactant, the surfactant molecules may form a monolayer at the interface between the oil and water, with the hydrophobic tails of the surfactant molecules dissolved in the oil phase and the hydrophilic head groups in the aqueous phase.

In one mode of the invention, the microemulsion formulation provides a lasting antimicrobial, anti-mold, anti-fungal shield on surfaces. The microemulsion also offers ultraviolet light protection to the surface.

Examples of surfaces that can be coated with the formulation include roofs, sidewalks, any kind of masonry, metals, plastics, wood, stucco, siding, shingles, decks, fences, and the like. Other surface applications can include grout, FRP board, ceilings, pipes, HVAC ducts, condensate lines, cooling coils, plants, trees, lawn furniture, stone and stonework, and wall chases. The formulation is ideal for coating surfaces where mold remediation is required.

The formulation also has insect repellant qualities when applied on a surface.

This listing of surfaces is only exemplary and the formulation can be used on any surface where a need exists to combat microbes and mold, provide UV protection, provide insect repellency, and generally protect a surface from the elements.

A preferred formulation is set out in the Table below.

| Active | % by weight/ 8.3 lb. per gallon of water | CAS USP | Status | |
|---|---|---|---|---|
| Zinc | .32 | 7774-66-6 | Active | anti-fungal/UV protection |
| sodium lauryl sulfate (SLS) | 2.92 | 151-21-3 | Active | antibacterial |
| thyme oil | .21 | 8007-46-3 | Active | Antibacterial |
| lemon grass oil | .044 | 8007-02-1 | Active | anti-fungal |
| Inactive/inert | | | | |
| citric acid | 1.91 | 77-92-9 | pH adjuster | Food grade |
| glycerin | 47 | 56-81-5 | emulsion | USP |
| isopropanol | 3.31 | 63-67-0 | emulsion | |
| tea tree oil | .2 | 68647-73-4 | fragrance and co-additive for thyme oil | |
| pH adjuster, e.g. sulfuric acid or acetic acid | .47 | SA 776-93-9 AA 8028-52-2 | | Food grade |
| water | | 7732-18-5 | dilution | |

It should be understood that the percentages of the various components can range 15%, more preferably 10% below and above the preferred amounts. The active ingredients of the microemulsion formulation are readily available using their CAS number.

For example, for the active ingredients, the zinc percentage could range from 0.27 to 0.37% and more preferably from 0.29 to 0.35%, and the SLS from 2.48 to 3.36%, and more preferably from 2.63 to 3.21%. The zinc is used in the form of a zinc dust, see CAS 7440-66-6. The zinc provides both anti-fungal properties and ultraviolet ray protection.

The SLS functions as an antibacterial. While SLS is disclosed as a preferred surfactant for use in the microemulsion, other surfactants similar to SLS can be used, e.g., coco glucoside or those surfactants that satisfy the 25(b) criteria of the Environmental Protection Agency (EPA) This listing of surfactants can be found in the EPA publication entitled Active Ingredients Eligible for Minimum Risk Pesticide Products (updated 2015), which is based on Federal Insecticide, Fungicide, and Rodenticide Act (FIFRA) under the Minimum Risk Exemption regulations in 40 CFR 152.35(f). This publication is incorporated by reference in its entirety herein. For purposes of this disclosure, this listing of active ingredients is defined as EPA-approved active ingredients in pesticide products.

The tea tree oil could range from 0.17 to 0.23% and more preferably 0.18 to 0.22%, and is added for fragrance. The tea tree oil also functions as a co-additive to enhance the anti-mold abilities of the thyme oil.

For the inactive or inert ingredients, the citric acid could range from 1.62 to 2.20% and more preferably from 1.72 to 2.1%. The citric acid functions as a pH adjuster.

The glycerin could range from 40.0 to 54.1% and more preferably from 42.3 to 51.7% and acts as a microemulsifier.

The thyme oil could range from 0.18 to 0.24% and more preferably 0.19 to 0.23%. The lemon grass oil can range from 0.037 to 051%, and more preferably from 0.40 to 0.048%. The thyme oil and lemon grass oil are considered active ingredients as the thyme oil functions as an antibacterial agent and the lemon grass oil functions as an anti-fungal agent.

While isopropanol is a preferred alcohol, any alcohol from 90 to 180 proof could be employed. The purpose of the alcohol is for microemulsification. The alcohol can range from 2.81 to 3.81% and more preferably from 2.98 to 3.64%.

The pH of the formulation should be adjusted to between 2.3 and 3.3. Sulfuric acid is just an example of a pH adjuster and any known pH adjuster could be used in the formulation. Acetic acid is one example of an alternative pH adjuster. The pH adjusters also contribute to microemulsification and should be of food grade quality. As the formulation can a food grade formulation in a preferred embodiment, all components should be of food grade quality.

Applications of the microemulsion on surfaces is believed to last for up to 1 to 5 years regardless of the weather conditions. Testing has been performed using accelerated conditions to simulate a 5-year life span and this testing has shown that the formulation is expected to inhibit mold growth over such a time period.

In applying the microemulsion formulation, any kind of an application can be used. Examples include spraying, brushing, brooming, and rolling. The formulation can also be wiped on a surface using an applicator like a rag, sponge, cloth, or the like, or even just poured on a surface. Any type of spraying can be employed for surface application, including electrostatic spraying. Different kinds of applications could be combined as well.

For a gallon of microemulsion formulation, the components are weighed out in their respective percentages and mixed with water. The percentages are adjusted depending on the volume of water used when making the formulation.

One significant advantage of the invention is being able to get the zinc into a microemulsion. Another advantage of the invention in a preferred embodiment is to provide a microemulsion, e.g., a sealer that falls under the EPA's minimum risk pesticide guidelines and is exempt from required registration under the Federal Insecticide, Fungicide, and Rodenticide Act, the exemption found in 40 CFR 132.25(f), which is incorporated by reference in its entirety. In other words, the components of the microemulsion can all fall under the listing of EPA active and inactive ingredients as listed in the exemption noted above. The active ingredients approved by the EPA are noted above when addressing the surfactant aspect of the invention. The inactive or inert ingredients are listed in the EPA publication entitled "Inert Ingredients Eligible for FIFRA 25(b) Pesticide Products (revised November 2016), which is incorporated by reference in its entirety herein. For purposes of this disclosure, this listing of inert or inactive ingredients is defined as EPA-approved inert ingredients in pesticide products.

Other advantages include the ability to provide a food grade microemulsion that is crystal clear for application and have at least extended mold control properties.

As such, an invention has been disclosed in terms of preferred embodiments thereof which fulfills each and every one of the objects of the present invention as set forth above and provides a zinc-dust containing microemulsion that has a number of properties such as sealing surfaces, anti-mold and anti-bacterial efficacy, UV protection, and insect repellency, is safe for the environment and methods of use.

Of course, various changes, modifications and alterations from the teachings of the present invention may be contemplated by those skilled in the art without departing from the intended spirit and scope thereof. It is intended that the present invention only be limited by the terms of the appended claims.

What is claimed is:

1. A microemulsion comprising, in weight percent:
    zinc dust in an amount ranging from about 0.27 to 0.37%, the zinc dust in suspension in the microemulsion,
    at least one surfactant in an amount ranging from about 2.48 to 3.36%,
    citric acid in an amount ranging from about 1.62 to 2.20%,
    glycerin in an amount ranging from about 40.0 to 54.1%,
    alcohol with a proof ranging from 90 to 180 and in an amount ranging from about 2.81 to 3.81%,
    tea tree oil in an amount ranging from about 0.17 to 0.23%,
    thyme oil in an amount ranging from about 0.18 to 0.24%,
    lemongrass oil in an amount ranging from about 0.037 to 0.048%,
    a pH adjuster to adjust the pH of the microemulsion between 2.3 and 3.3, and
    water, the weight percentages based on the weight of a gallon of water, or 8.3 lbs.

2. The microemulsion of claim 1, wherein the pH adjuster is sulfuric or acetic acid.

3. The microemulsion of claim 1, wherein the alcohol is isopropanol.

4. The microemulsion of claim 1, wherein the surfactant is one or more of sodium lauryl sulfate, coco glucoside or a surfactant included in EPA-approved active ingredients eligible for minimum risk pesticide products, updated December 2015.

5. The microemulsion of claims 1, wherein the microemulsion is a food grade microemulsion.

6. The microemulsion of claim 1, wherein all components of the microemulsion are listed in EPA-approved active ingredients in pesticide products, updated December 2015 or inert ingredients eligible for FIFRA 25(b)) pesticide products, revised November 2016.

7. A method of coating a surface for at least one of mold control, insect repellency, UV protection, or as antimicrobial comprising applying the microemulsion of claim 1 to the surface.

8. The method of claim 7, wherein the surface is one or more of metal, wood, masonry, plants, plastic, trees, and soil.

9. The method of claim 8, wherein the surface further comprises stucco, siding, shingles, decks, fences, grout, FRP board, ceilings, pipes, HVAC ducts, condensate lines, cooling coils, lawn furniture, stone and stonework, and wall chases.

10. The method of claim 7 wherein the microemulsion is applied to a surface using one or more of a brush, a roller, a sprayer, a broom, or wiped on the surface using an applicator like a cloth, rag, or the like, or is poured onto the surface.

11. The method of claim 7, wherein the microemulsion is used for mold control.

* * * * *